United States Patent

[11] 3,627,069

[72] Inventors Robert H. Ray
Cinnaminson;
John M. Holt, Cherry Hill, both of N.J.
[21] Appl. No. 45,697
[22] Filed June 12, 1970
[45] Patented Dec. 14, 1971
[73] Assignee Applied Information Industries

[54] WEIGHER WITH OPTICAL DETECTOR
17 Claims, 7 Drawing Figs.
[52] U.S. Cl............................................. 177/178,
177/210, 177/DIG. 6, 250/219 DD, 250/231 R
[51] Int. Cl............................................. G01g 23/32
[50] Field of Search........................................ 177/177,
178, 210, DIG. 6; 353/40; 250/219 DD, 231

[56] References Cited
UNITED STATES PATENTS
2,797,614  7/1957  Heidenhain................. 177/DIG. 6
2,807,189  9/1957  Wagner....................... 177/178
2,818,769  1/1958  Williams..................... 117/178 UX
3,023,318  2/1962  Jones.......................... 250/219 DD
3,061,026  10/1962 Hecox et al................. 177/DIG. 6
3,103,651  9/1963  Heinecke et al............ 250/219 DD Primary Examiner—Richard B. Wilkinson
Assistant Examiner—George H. Miller, Jr.
Attorney—Morton C. Jacobs ABSTRACT: In a computer weigher, an optical device is used to detect the position of balance of the weigher mechanism by measuring the rotary position of a drum connected to the weigher mechanism. On the drum, a Gray code chart is arranged around the periphery of the drum with several channels extending axially. A mounting block is adjustably positioned adjacent to the drum and is used to mount fiber optics and photoelectric measuring means. For each channel of code on the drum chart, a fiber optics bundle picks up reflected light at one end adjacent to the chart and transmits it to its other end at a photoelectric sensor. Binary coded signals are generated from the sensor outputs which accurately identify each drum position.

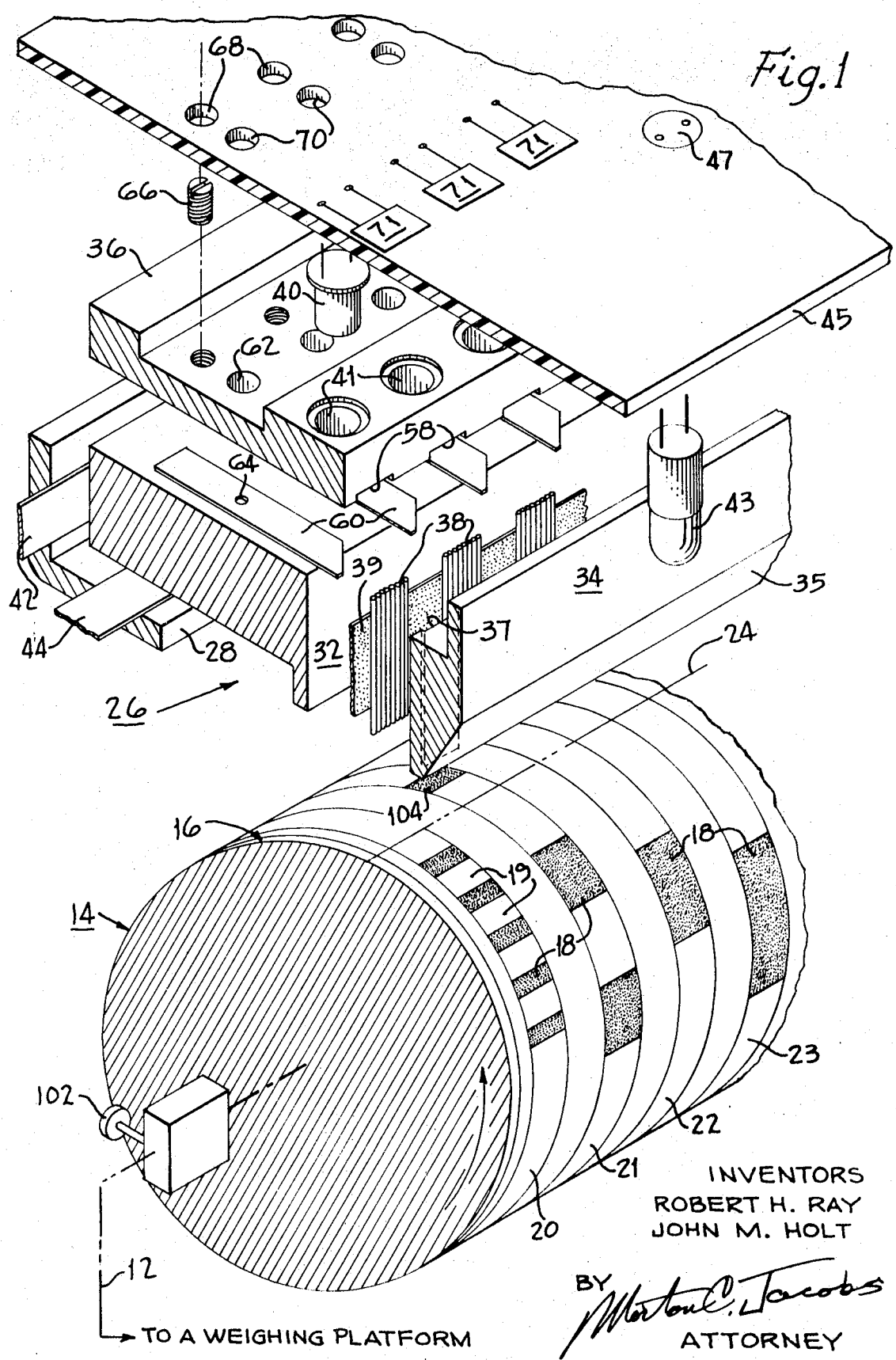

Patented Dec. 14, 1971
3,627,069
3 Sheets-Sheet 2
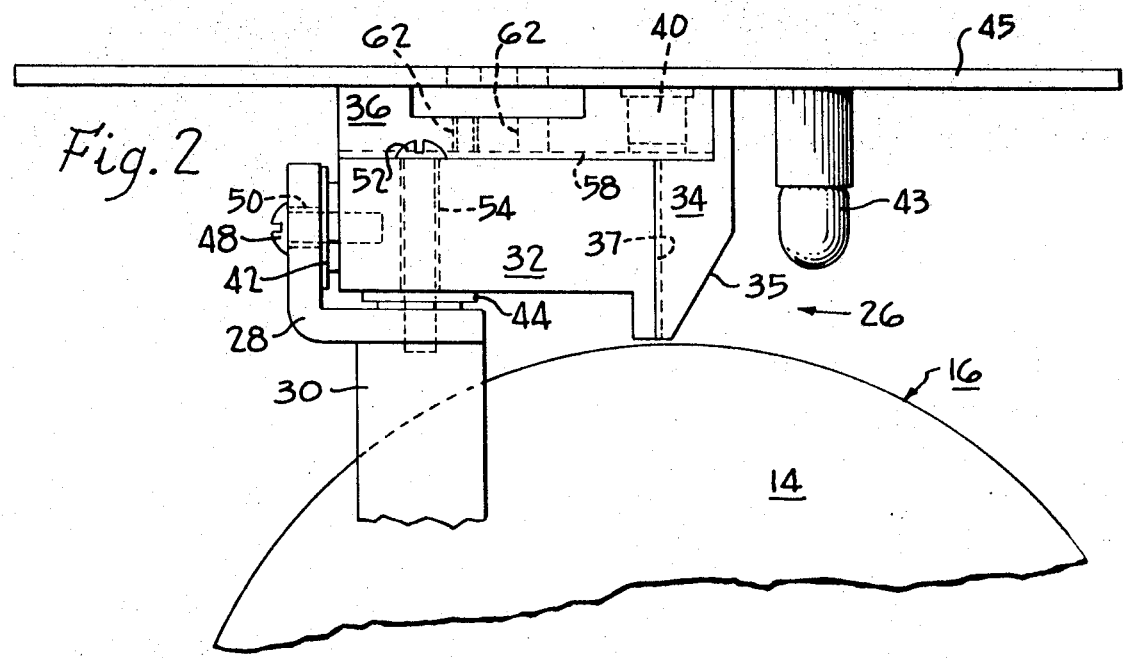
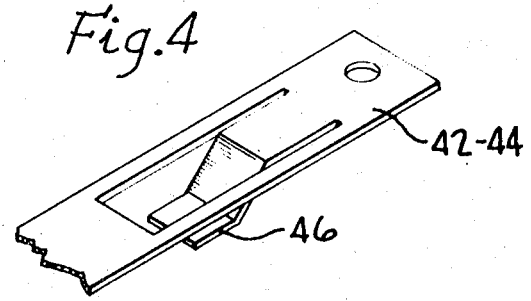
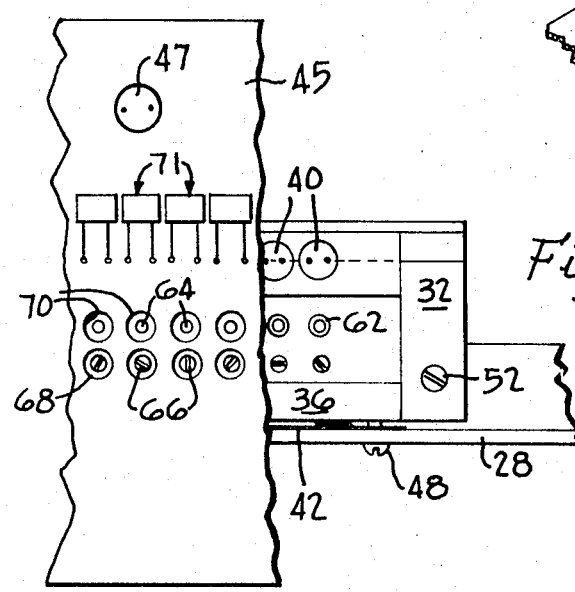
INVENTORS
ROBERT H. RAY
JOHN M. HOLT
BY Morton C. Jacobs
ATTORNEY INVENTORS
ROBERT H. RAY
JOHN M. HOLT
BY Morton C. Jacobs
ATTORNEY

WEIGHER WITH OPTICAL DETECTOR

BACKGROUND OF THE INVENTION

This invention relates to a weigher mechanism and particularly to an optical device for producing digital signals corresponding to each position of balance of the weigher.

This invention has particular application in computer weighing mechanisms in which a digital representation of the weight is obtained, and the weight is multiplied by the unit price of a commodity being weighed. Digital computer devices suitable for this purpose are known in the art; applicants' copending U.S. Pat. application, Ser. No. 12,998 describes a computer weigher system in which this invention is used. An optical device for another computer weigher is described in U.S. Pat. No. 3,439,760 in which lenses are employed for focusing light from a lamp through a planar, transparent coded chart and through slits to a battery of photocells.

A common weigher mechanism used generally in supermarkets and the like includes a platform for receiving commodities to be weighed. The platform is connected through a mechanical linkage to a rotatable drum, which drum conventionally carries a price chart. This invention has a particular application for use with such supermarket weighers.

SUMMARY OF THE INVENTION

It is among the objects of this invention to provide an optical weigher device for developing digital signals representative of the weigher position, which device and a compact mounting therefor can be readily attached to such drum weighers.

Another object is to provide a new and improved weigher with a photoelectric system for developing digital signals accurately representative of the weigher position.

Another object is to provide a new and improved weigher using a photoelectric sensor that does not require the use of lenses.

In accordance with one embodiment of this invention, a weigher drum has a binary Gray code chart for establishing a digital representation of each rotary position of the drum. The chart is formed of a plurality of parallel channels extending axially, with each channel containing alternating black and white markings. A separate photocell is provided for each channel, as well as a separate fiber optics device. The latter receives at one end the light reflected from the associated channel and transmits it to the photocell at the other end. An amplifying mechanical linkage between the weigher platform and the drum of large diameter is used for sensing weight measurements with a high degree of accuracy.

A separate two-state circuit is connected to each photocell and is triggered to opposite states as the drum chart moves and corresponding changes occur in position of the chart markings adjacent to the associated fiber optics element. The light level to each photocell is adjusted as is the threshold response of each trigger circuit, so that generally uniform triggering of the circuit occurs at corresponding points of transition of the code markings from black to white and white to black. Ambiguity in a drum position measurement due to weigher balance at a marking transition midway between two digital positions is avoided by providing the trigger circuit with hysteresis. Radial and axial adjustment of the fiber optics devices accurately establishes a reference measurement line with respect to the code channels.

BRIEF DESCRIPTION OF THE DRAWING

The foregoing and other objects of this invention, the various features thereof, as well as the invention itself, may be more readily understood from the following description when read together with the accompanying drawing, in which:

FIG. 1 is a perspective, exploded view of a weigher embodying this invention;

FIG. 2 is a side elevation view of the weigher of FIG. 1;

FIG. 3 is a fragmentary plan view of the weigher of FIG. 1;

FIG. 4 is a perspective view of a spring element used in the weigher of FIG. 1;

DESCRIPTION OF A PREFERRED EMBODIMENT

Figure 5:
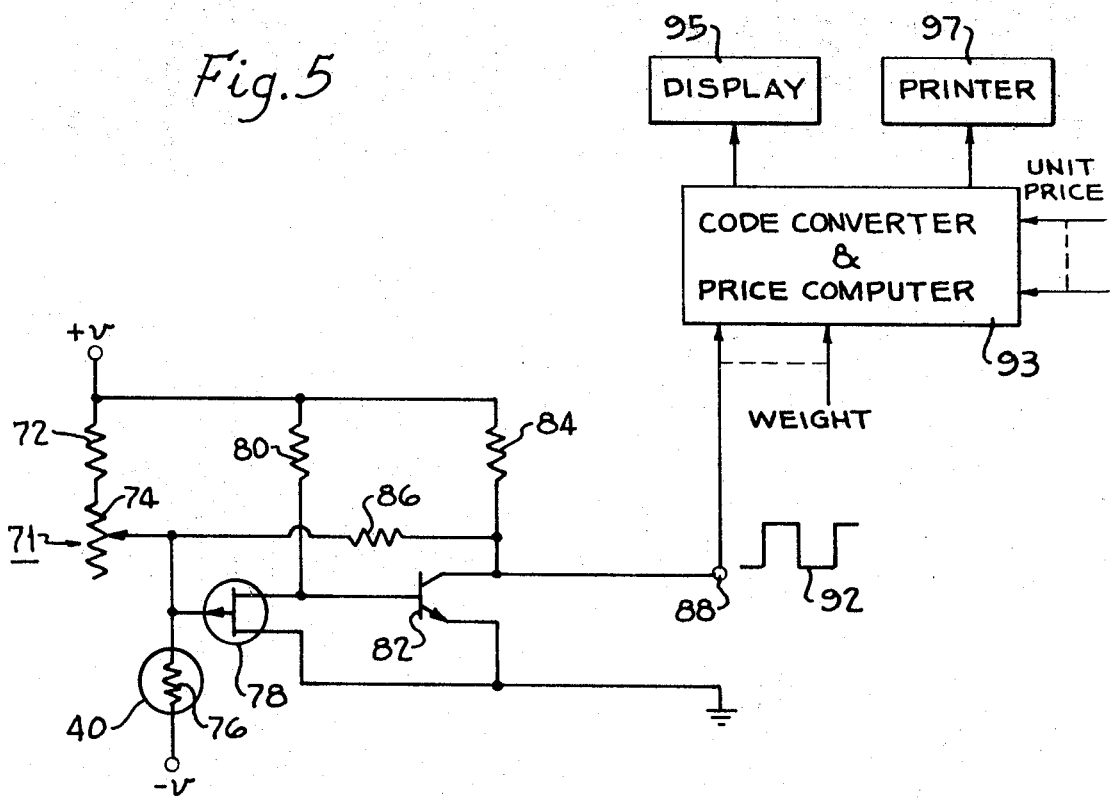
FIG. 5 is a schematic circuit diagram of a trigger circuit used in connection with the photocells of the weigher of FIG. 1.

In the drawing, corresponding parts are referenced throughout by similar numerals.

In the embodiment illustrated in FIG. 1, a conventional weigher includes a weighing platform connected by a conventional mechanical linkage 12 to drive a rotatable drum 14. The drum 14 rotates with movement of the weighing platform under the weight of a commodity placed thereon such that each rotary position of the drum corresponds to a certain movement of the platform and therefore to a particular weight. The linkage 12 amplifies the platform movement, and the periphery of a relatively large drum 14 can be used for an enlarged and accurate measurement of the balanced weight.

Wrapped around the drum 14 is a chart 16 (e.g. printed on paper or plastic) bearing markings that form a plurality of channels 20–23. Each channel 20–23 consists of a set of rectangular black markings 18 that alternate with white markings 19 (formed, for example, by the background of the chart 16) around the periphery thereof. These markings are in a binary code, whereby at each rotary position of the drum with respect to a reference line 24 parallel to the drum axis, the combination of white and black markings represent a coded combination uniquely representative of that drum position. In this arrangement, the black markings represent binary "1" and the white markings binary "0." For any particular weight, at least one of the channels is black, and the black and white markings in combination along the line 24 of channels from a binary representation of the weight and, as explained below, give rise to a combination of binary electrical signals. The zero-weight position and out-of-range positions are all white and thus all 0's, except for a mark in one channel, as explained below. The particular binary code that is used for the chart markings is known as a Gray code, which is so arranged that in going from any one rotary position to the next, the marking in but a single channel changes between white and black. Thereby, the transitions in rotary drum position are unambiguous and do not lead to spurious code combinations being generated at those transitions.

An optical detector unit 26 is mounted adjacent the drum surface and is secured to a right-angle bracket 28, which in turn is secured to the frame 30 (FIG. 2) of the overall weigher housing. The device 26 is assembled on a three-member structure: a base block 32, a fiber optics mounting plate 34, and a sensor mounting plate 36. The base 32 is secured directly to the bracket 28, and the plates 34 and 36 are secured by screws to the base. The fiber optics plate 34 has a tapered outer face 35 and a plurality of parallel grooves 37 formed in the inner planar face thereof, which grooves correspond in width to the width of the respective chart channels 20–23. Each such groove 37 carries a flat bundle of optical fibers 38. The fibers may be of any suitable light conducting material, such as glass or plastic, and each such fiber may have a thickness of the order of 0.01 inch or less. The smaller the diameter of the fibers, generally the higher is the resolution of the system. A single layer of fibers is formed in each groove. Each such bundle of fibers extends a fraction of an inch (e.g. a ¼ inch) in width corresponding approximately to the diameter of the face of an associated photoelectric sensor 40. The fiber bundles 38 are assembled on a thin adhesive tape 39, and the assembly is clamped between the blocks 32 and 34 (FIG. 2).

Each of a plurality of the sensors 40 is mounted in an associated opening 41 in plate 36 so that the face of the sensor is directly adjacent to the outer end of its associated fibers 38. The size and spacing of the photosensors (e.g. a face of about ¼ inch diameter) tends to be a limiting factor in the compactness of the unit 26. The fiber mounting plate 34 precisely aligns the bundle of fibers for each channel, and aligns the bundles for the successive channels. Thereby, the inner ends of the fibers adjacent to the drum chart 18 form the reference line 24 which extends generally parallel to the axis of the drum and defines the combination of channel markings 18 and 19 that lie opposite the fibers for any rotary position of the weigher drum. Thus, each fiber bundle 38 picks up at its inner end the light (a very large amount for a white marking and a small amount for a black marking) reflected from the directly adjacent portion in the associated channel 20–23. The fiber bundle transmits that light to the face of the associated photoelectric sensor 40 at the outer end of the fibers. The light is supplied by a plurality of spaced lamps 43 that are mounted in sockets 47 on a printed circuit board 45. The board 45 is secured on top of a plate 36 and carries the electrical connections for the lamps 43 and the photoelectric sensors 40 (which are plugged into the board), as well as other circuitry described below. The face 35 of block 34 is tapered to permit lamplight to impinge on the chart surface opposite reference line 24 for reflection to the fibers. A suitably diffused light distribution is achieved with a plurality of lamps 43 spaced along the drum; alternatively, separate fiber optics can be used to transmit the lamplight to the chart surface directly adjacent the pickup ends of fibers 38.

The base 32 is adjustably mounted on bracket 28 by means of two strip springs 42 and 44. The springs are identical and each consists of a metallic strip having a plurality of portions 46 (FIG. 4) stamped out near its ends and at intermediate locations and bent out of the plane of the remainder of the strip to form a spring element. Adjustment of the base 32 horizontally is achieved with a pair of headed adjustment screws 48 at opposite ends of the block, which screws pass through the vertical arm of the bracket 28 (enlarged holes 50 in that arm permit movement of the screws with respect to the bracket) and through the ends of spring 42, and are threadedly engaged in the rear face of the base 32. Similarly, vertical adjustment of the base 32 is by means of a pair of adjustment screws 52 (FIGS. 2 and 3) at opposite ends of the block and extending through enlarged holes 54 in the outer ends of the base (which ends are not covered by the top plate 36) and through the springs 44 and into threaded holes in the horizontal arm of the bracket 28.

Thus, by means of the adjustment provided by screws 52, the base 32 is moved vertically with respect to a horizontal plane to adjust the radial spacing of the line of optical fibers from the surface of the drum chart 16. The spring 44 permits varied adjustments to be made at each end. The horizontal screws 48 adjust the base 32 tangentially and thereby adjust the orientation of the line 24 of fibers 38 with respect to an axial combination of markings so as to be parallel to those markings. The setting of reference line 24 is important to accurately define the particular rotary position of the drum chart 16. Thus, the tangential adjustment provided by screws 48 and 49 ensures that the line 24 of the fibers is properly oriented to pick up that combination of channel reflections properly associated with the drum position. The adjustment radially varies the spacing (e.g., down to hundredths of an inch) and thereby the light reflected into the fiber optics from the lamp; this adjustment affects the precision of measurement by determining the marking region from which reflections are received. The enlarged holes 50 and 54 permit the two transverse adjustments to take place without interference between them.

The line of spaced holes 41 for the sensors 40 extends through the mounting plate 36 so that the photoelectric sensors 40 positioned in those holes have their light receptor face open to receive light from the upper ends of the fiber bundles 38. The mounting plate 36 is attached directly to the base 32 with its forward end overlapping the fiber mounting plate 34 so that the line of fibers extends substantially along the line of diameters of the holes 41 and thereby of the faces of sensors 40. A series of grooves 58 are cut in the lower face of the plate 36, and slidably mounted in each of those grooves, between plate 36 and base 32, is a thin opaque strip 60 having a tapered end extending across the face of the sensor 40. The strip 60 functions as an iris and is slidably adjusted by means of a pin probe (not shown) which may be inserted in a hole 62 of the mounting plate 36 to engage in a corresponding hole 64 in the iris 60 so that the latter may be manipulated a short distance forward or back along groove 58. A set screw 66 extends through the mounting plate 36 and engages with the upper face of the iris 60 to retain the latter in its adjusted position. Corresponding holes 68 and 70 in the circuit board 45 permit access to the set screws 66 and the probe holes 62. In this fashion, the light opening to the face of each photocell 40 may be separately adjusted to control the quantity of light supplied thereto.

Mounted on the circuit board 45 are a plurality of trigger circuits 71, one for each photosensor 40. These circuits are identical and one is illustrated in FIG. 5. Each trigger circuit includes a voltage-divider input circuit in the form of a series combination of a fixed resistor 72, a potentiometer 74, and the resistance 76 of the photosensor 40, all connected between plus and minus terminals of a regulated voltage supply. A suitable form of photosensor that has been used is a cadmium selenide cell (e.g. Vactec VT-212L) having a resistance that varies in response to the varying light transmitted by the fibers 38. A low resistance corresponds to a white marking 19 and a high resistance corresponds to a black marking 18. The cell is operated at intermediate points on its characteristic corresponding to these two extremes of reflected light. The tap of the potentiometer 74 is connected directly to the gate of a first transistor 78; preferably field-effect transistors (FET) are employed to provide a high input impedance. The source of transistor 78 is returned to ground, and the drain is connected via a resistor 80 to the positive voltage terminal and also to the base of a second transistor 82. The latter's emitter is connected to ground, and its collector is connected via a resistor 84 to the positive voltage terminal, and via a feedback resistor 86 to the gate of the FET 78. The collector is also connected to an output terminal 88.

Figure 6:
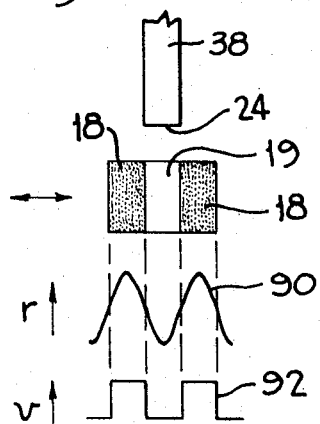
FIG. 6 is an idealized graphical diagram of waveforms occurring in connection with the trigger circuit of FIG. 5.

In FIG. 6, a schematic graphical diagram is presented illustrating the idealized waveforms that occur with the movement of a channel of the drum chart 16 and its black and white markings 18 and 19, respectively, past the reference line 24 formed by the line of fibers 38. The photoresistance r represented by graph 90 (see also graph 97 in FIG. 7) is greatest when the reference line 24 is directly opposite the midpoint of the black marking 18, and this resistance tends to decrease as the chart is moved away from that position and toward a white marking, with a transition in resistance occurring at the line between the two markings 18 and 19. The minimum photocell resistance is set to occur when the fiber receives reflected light fully from a white marking 19.

In the operation of the optical detector circuit of FIG. 5, the resistance 76 of the photosensor 40 is reduced when the light corresponding to that of a white marking is supplied thereto, which reduces the voltage at the gate of FET transistor 78, tending to turn that transistor off. This action in turn increases the voltage at the base of transistor 82 to turn it on. The collector voltage decreases and, by means of the feedback resistor 86, tends to further reduce the voltage at the gate of transistor 78 to accelerate the turning off of that transistor and the switching of the circuit to a white-marking state in which transistor 78 is in the off condition, transistor 82 is on, and the output voltage is low, near ground. When the light supplied to the photosensor 40 is reflected from the black marking 18, the reverse operation occurs, with the resistance 76 increasing, which increases the voltage at the gate of the transistor 78 tending to turn it on, which in turn results in a turning off of transistor 86 and the feedback of a high voltage to switch the circuit to its opposite black-marking state in which the output voltage is high. Thus, the output voltages are rectangular voltage steps $v$ (graph 92, FIG. 6) of two distinct amplitudes, and they are used as digital signals for operating a digital display device and a digital computer as described in the aforementioned copending patent application.

The binary signals 92, representative of weight at the outputs 88 of the trigger circuits 71, are in Gray code. For purposes of performing price calculations, these signals are converted to another binary code form, such as binary coded decimal. A code converter and digital computer 93 performs this code conversion and multiplies the weight signals by unit price signals (established by keyboard switches) to generate total price signals, as explained in the aforementioned copending patent application. All three sets of signals are repeatedly supplied to a visual display device 95 as the weigher platform moves to balance. When the weigher is in balance, the user operates a switch for transfer of these signals to a printer 97 for printing a price tag.

The optical detector of this invention does not employ any lenses for magnification, but instead relies on the magnification provided by the conventional mechanical linkage 12 (e.g. rack and pinion gear) between the weigher platform (mounted on knife edge fulcrums) and the drum. In commercially available weighers, such a drum is greater than 8 inches in diameter and has a periphery of greater than 25 inches. This periphery is ample for the measurement of a 15-pound weight to the nearest 0.01 pound. For such a drum size, it has been found that a measurement to 0.01 pound can be achieved with markings of about 0.017 inch (i.e. corresponding to a rotary drum movement of that peripheral amount). Actually, reliable measurements can take place down to the diameter of the fiber itself, namely, to 0.01 inch and, if desired, to measurements of the order of one-half that diameter. Thus this invention has special utility with existing weighers, which have mechanical systems that are well damped and not seriously affected by the vibration of a table, so that no special supports or mountings are required. Moreover, the optical detector unit can be made quite compact (e.g. less than 12 inches in length and quite shallow in depth), since there is no requirement of space to accommodate the focal lengths of lenses. Accordingly, it has been found that the Gray code chart and optical detector of this invention can be employed for outfitting existing weighers by applying the chart around the drum of such a weigher and mounting the compact optical detector within the space available in the frame of such a weigher.

The aforementioned photosensors 40 have a wide range of characteristic resistance. A reference value of this characteristic is established (e.g. 50 kilohms resistance for the condition of the reflected light being from a white marking) by means of the adjustment of the iris strip 60. That is, the tapered end of the strip is moved to increase or decrease the light opening between the ends of fibers 38 and the face of photosensor 40 (the tapered end effectively provides a fine adjustment for blocking individual ones of the fibers), to establish an approximately uniform response to white markings. The response to the dark markings is established by the adjustment of potentiometer 74, so that FET transistor 78 switches on at a certain high value of photocell resistance (e.g. about 100 to 200 kilohms). Thereby, good symmetry of the switching action at white and dark markings is obtained. That is, the two-state circuit 71 switches substantially uniformly at the transition lines between these markings, so that the widths of square waves 92 generated by movement of successive markings past the fiber line 24 are substantially uniform, as indicated in FIG. 6. Thus, a repeatable high precision is achieved in the response of the optical detector to the transitions between white and dark markings. This ensures accurate weight measurements to at least 0.01 pound.

When the weigher drum comes to substantial balance, it may position the chart so that a transition line 94 between the black and white markings 18 and 19 in one of the channels is effectively opposite the reference line 24 (the midsection of the fibers 38). Under such circumstances, an ambiguity tends to arise as to whether the weight corresponds to that associated with the black marking or that associated with the white marking, which markings respectively correspond to two different least significant digits of the weight. The slightest movement of the drum can result in an oscillation of the digital code between those least significant digits. For example, the display output may oscillate between 3.04 and 3.05 pounds. This variation in digital output is confusing to the user and to a customer. In addition, the optical detector of this invention may be employed with a printer 97 (as explained in applicants' aforementioned copending application). Such a printer may register one of those two measurements at one instant, while the visual display 95 may register the other at another instant, so that to the customer the printed weight is not consistent with that visually displayed. The trigger circuit 71 is constructed to avoid such ambiguities.

Figure 7:
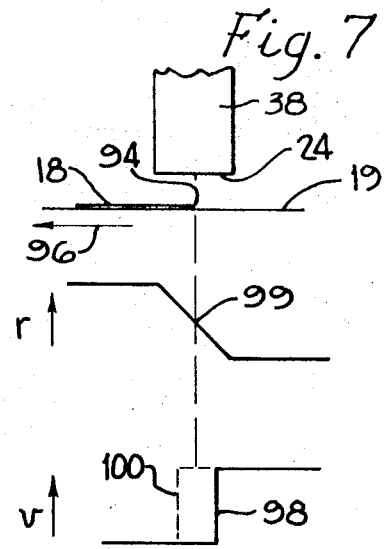
FIG. 7 is another idealized graphical diagram of circuit waveforms.

The trigger circuit 71 switches from one state to the other almost at the point of transition when the fiber line 24 is centered directly opposite the transition line 94, between the white and black markings 19 and 18 respectively (FIG. 7). However, in each of its two states, as a consequence of the feedback resistor 86, the bias voltage is enhanced slightly in the direction to resist the switching action. That is, this enhanced bias must be overcome by the change in photoconductance before the FET 78 starts to switch. As indicated in the idealized graphical diagram of FIG. 7, the FET 78 does not switch exactly at the transition line 94 when the fiber 38 is centered at that line and the chart is moving in the direction of arrow 96. Instead, as indicated by the voltage step-up 98, the FET 78 switches when the transition line 94 moves slightly beyond the center of the fiber 38. This operation also occurs when the transition is from the white to the black marking (when the chart moves in the reverse direction from that indicated by arrow 96). The voltage stepdown indicated by the broken line 100 represents the voltage generated when the chart moves thus in the reverse direction. Though the photoresistance $r$ varies along the same characteristic 99, the steps 98 and 100 are spaced. Thus, a small amount of hysteresis is added to the circuit 71 so that a movement approximately 15 percent past the transition line 94 is required before the circuit actually switches over. Consequently, when the drum comes to balance with the fiber optics directly centered on a transition line 94 between the two markings, the trigger circuit is not switches to its opposite state, but remains in the previously existing state. In effect, this operation requires that the drum move a transition line 94 a small but substantial distance (e.g. corresponding to about 0.002 pound) past the center of the fiber 38 before the switching action takes place and the next 0.01 pound is registered. A transition line 94 may be considered as representing the 0.005 pound position and the hysteresis in the trigger circuit ensures that a movement beyond that transition occurs before the movement is registered. Accordingly, there is no ambiguity in the weight registered by the optical system. Since this hysteresis effect is symmetrical, there is no adverse effect on the symmetry of the trigger circuit output signals 92, which continue to be symmetrical, though the train of pulses generated with movement of the chart in one direction are slightly offset from those resulting from the opposite chart movement.

This invention may be used with various Gray codes. One that has been found useful is that in which the zero-weight code is represented by all white markings 19. However, a black marking is provided in one of the channels at the rotary position corresponding to -0.01 pound, as shown in FIG. 1 of the drawing, in which reference line 24 is indicated to be at the zero-weight position of the drum, and the negative-weight marking 104 is in a different channel from, but located negatively at the same weight division as, the marking for +0.1 pound, the smallest weight graduation. This marking at a precise negative-weight position makes it possible to locate the zero-weight position. For example, the adjustment of the scale for the precise indication of zero weight may be made by manual adjustment of the balance screw 102 customarily provided for such scales. Such a balance screw serves to provide a fine adjustment of the position of a balance weight with respect to the fulcrum. Thus the screw 102 may be adjusted until a coded weight for position −0.01 pound is displayed, and then this adjustment is reversed until the display indicates +0.01 pound. By rotating back one-half this latter adjustment, the scale is set at zero weight. This adjustment of the zero weight is within the precision of the location of the edges of the markings for the +0.01 and −0.01 pound, and is not dependent upon the width of a marking of the zero-weight position. In addition, the single negative-weight marking is consistent with the unambiguous Gray code that is used. The particular channel in which the marking is located is one to provide a binary code which the code converter 93 recognizes as clearly outside of the range otherwise employed, so that the display 95 registers a weight that would not be accepted as valid by the user. The arrangement of markings on the drum shown in FIG. 1 is not intended to be representative of an actual Gray code, and suitable forms of such codes are well known in the art. At the high end of the range (e.g. 15 pounds), additional Gray code markings are provided (e.g. 15.01 and 15.02 pounds), followed by all white in order that the 15-pound marking at the end of the valid range does not have a Gray code discontinuity leading to possible ambiguities. Various other code systems may be used with this invention.

Accordingly, applicants have provided a new and improved weigher using photoelectric sensors for developing digital signals accurately representative of the weigher position over a substantial range of weights. The system does not require the use of lenses for purposes of magnification of the relatively small movement of the weigher platform; however, where desired, lenses may be used in addition to the mechanical magnification of the platform (e.g. a cylindrical objective lens may be placed at the input end of the optical fibers in order to provide an enlargement of the scale markings that are employed). The optical weigher device of this invention and a compact mounting therefor can be readily attached to existing drum weighers. Various modifications of this invention will be apparent to those skilled in the art from the above description, which is presented as illustrative of one form of the invention.

What is claimed is:

1. In a weigher mechanism having a rotatable drum linked to a weighing platform for producing a rotary movement proportionally greater than that of the platform, an optical sensor device comprising:
   a chart mounted around said drum and having markings thereon of different light reflection characteristics, said markings being arranged in a plurality of channels extending successively along the axis of the drum, and with a different combination of markings established at each rotary position of the drum;
   means for illuminating said chart;
   separate photoelectric means for each channel;
   a separate fiber optics device for each channel;
   means for mounting said illuminating means, fiber optics devices and photoelectric means adjacent to said chart so that light is reflected from said chart to one end of each of said fiber optics devices and transmitted thereby to said photoelectric means of the associated channel at the other end of said device;
   and means for deriving combinations of electric signals from said photoelectric means corresponding to said marking combinations.

2. In a weigher mechanism, an optical sensor device as recited in claim 1, wherein said means for mounting said illuminating means, fiber optics devices and photoelectric means includes a unitary device for retaining said illuminating means, fiber optics devices and photoelectric means in a predetermined relation.

3. In a weigher mechanism, an optical sensor device as recited in claim 1, wherein said means for deriving combinations of signals includes separate means for each channel for generating binary signals corresponding respectively to said different markings and for generating substantially uniform electric signals in response to varied levels of light reflected from regions of transition between markings of different reflection characteristics.

4. In a weigher mechanism, an optical sensor device as recited in claim 3, wherein each of said binary signal-generating means includes a two-state pulse-generating circuit for assuming one or the other of two states corresponding respectively to said different markings.

5. In a weigher mechanism, an optical sensor device as recited in claim 4, wherein said pulse-generating means has a hysteresis characteristic in changing from one state to the other in response to movement of said marking transition regions adjacent to said one end of said fiber optics elements.

6. In a weigher mechanism, an optical sensor device as recited in claim 4, wherein said uniform signal-generating means includes means operative with said photoelectric means for producing changes in state of said two-state pulse-generating circuit at substantially corresponding areas of said transition regions between markings.

7. In a weigher mechanism, an optical sensor device as recited in claim 6, wherein said means operative with said photoelectric means includes separate means for adjusting the quantity of light transmitted to each of said photoelectric means to make uniform the photoelectric response characteristic to light from certain ones of said markings.

8. In a weigher mechanism, an optical sensor device as recited in claim 6, wherein said means operative with said photoelectric means includes means for adjusting the signal response characteristic of each of said two-state circuits.

9. In a weigher mechanism having a rotatable drum linked to a weighing platform for producing a rotary movement proportionally greater than that of the platform, an optical sensor device comprising:
   a chart mounted around said drum and having markings thereon of different light reflection characteristics, said markings being arranged in a plurality of channels extending successively along the axis of the drum, and with a different combination of markings established at each rotary position of the drum;
   means for illuminating said chart;
   separate photoelectric means for each channel;
   a separate fiber optics device for each channel;
   means for mounting said illuminating means, fiber optics devices and photoelectric means adjacent to said chart so that light is reflected from said chart to one end of each of said fiber optics devices and transmitted thereby to said photoelectric means of the associated channel at the other end of said device;
   and means for deriving combinations of electric signals from said photoelectric means corresponding to said marking combinations, said means for mounting said illuminating means, fiber optics devices and photoelectric means including a unitary device for retaining said illuminating means, fiber optics devices and photoelectric means in a predetermined relation, each of said fiber optics devices including a plurality of fibers having said one end thereof in a straight line, and said unitary device including means for assembling said fibers of each said optics device with said one ends thereof along a common straight line extending over said marking channels.

10. In a weigher mechanism, an optical sensor device as recited in claim 9, wherein said mounting means includes means for adjusting said unitary device toward and away from the surface of said drum to vary the spacing of said common line with respect to said drum surface.

11. In a weigher mechanism, an optical sensor device as recited in claim 9, wherein said adjusting means includes separate means for adjusting the ends of said common line.

12. In a weigher mechanism, an optical sensor device as recited in claim 9, wherein said mounting means includes means for adjusting said unitary device in a plane generally tangential to the surface of said drum to vary the direction of said common line over said marking channels.

13. In a weigher mechanism, an optical sensor device as recited in claim 12, wherein said adjusting means includes separate means for adjusting the ends of said common line.

14. In a weigher mechanism, an optical sensor device as recited in claim 12, wherein said mounting means further includes means for adjusting said unitary device toward and away from the surface of said drum to vary the spacing of said common line with respect to said drum surface.

15. In a weigher mechanism having a weighing platform, a sensor device comprising:

means linked to said weighing platform for movement therewith and having scale graduations thereon of different characteristics, said graduations being arranged in a plurality of channels so that different combinations of graduations correspond to different positions of said platform;

separate sensing means for each channel mounted to detect the scale graduations in the associated channel;

and means for deriving combinations of electric signals from said sensing means corresponding to said graduation combinations, said signal deriving means including a separate two-state circuit for each channel for assuming one or the other of two states and for generating binary signals corresponding respectively to said different graduations and for generating substantially uniform electric signals at regions of transition between graduations of different characteristics;

said two-state circuit having a hysteresis characteristic in changing from one state to the other and from said other to said one state in response to movement of said graduation transition regions, whereby a definite movement of said scale graduation means beyond said transition region is required to change the state of said circuit.

16. In a weigher mechanism, a sensor device as recited in claim 15, wherein said scale graduations are markings having different light characteristics;

and said sensing means includes photoelectric means.

17. In a weigher mechanism having a weighing platform, a sensor device comprising:

means linked to said weighing platform for movement therewith and having scale graduations thereon of different characteristics, said graduations being arranged in a plurality of channels so that different combinations of graduations correspond to different positions of said platform;

separate sensing means for each channel mounted to detect the scale graduations in the associated channel;

and means for deriving combinations of electric signals from said sensing means corresponding to said graduation combinations for different platform positions;

said scale graduations being arranged in said channels in accordance with a Gray code so that a graduation in but a single column changes characteristic for each change in platform position corresponding to the smallest discrete change represented by said code, said graduations in said channels are all of the same characteristic for the zero-weight platform position, and one of said channels includes a scale graduation located in a negative-weight position, so that with adjustment of the weighing platform between said negative-weight graduation and one of the other of said scale graduations the zero-weight position of said scale can be located;

said signal combination deriving means including means for registering weights within a certain range starting with zero for said combinations of said scale graduations except for said negative-weight graduation and for registering a weight outside of said range for a combination including said negative-weight graduation.

* * * * *